United States Patent [19]
Moyer

[11] Patent Number: 5,889,973
[45] Date of Patent: Mar. 30, 1999

[54] METHOD AND APPARATUS FOR SELECTIVELY CONTROLLING INTERRUPT LATENCY IN A DATA PROCESSING SYSTEM

[75] Inventor: William C. Moyer, Dripping Springs, Tex.

[73] Assignee: Motorola, Inc., Schaumburg, Ill.

[21] Appl. No.: 414,466

[22] Filed: Mar. 31, 1995

[51] Int. Cl.$^6$ .............................. G06F 9/46; G06F 9/00; G06F 13/24

[52] U.S. Cl. ....................... 395/376; 395/385; 395/183.1; 395/183.11; 395/733; 395/739; 395/740

[58] Field of Search ..................... 395/375, 550, 395/700, 725, 733–741, 376, 183.1, 183.11

[56] References Cited

U.S. PATENT DOCUMENTS

| | | | |
|---|---|---|---|
| 4,291,371 | 9/1981 | Holtey | 395/737 |
| 4,709,324 | 11/1987 | Kloker | 395/383 |
| 4,885,682 | 12/1989 | Komoto | 395/583 |
| 5,317,745 | 5/1994 | Chan | 395/737 |
| 5,363,506 | 11/1994 | Fukuoka | 395/740 |
| 5,404,536 | 4/1995 | Ramakrishnan et al. | 395/727 |
| 5,437,039 | 7/1995 | Yuen | 395/678 |
| 5,535,380 | 7/1996 | Bergkvist, Jr. et al. | 395/557 |
| 5,572,667 | 11/1996 | Ideta | 395/733 |
| 5,603,035 | 2/1997 | Erramoun et al. | 395/733 |
| 5,613,129 | 3/1997 | Walsh | 395/740 |
| 5,638,525 | 6/1997 | Hammond et al. | 395/385 |
| 5,701,494 | 12/1997 | Satoh | 395/735 |

OTHER PUBLICATIONS

John Uffenbeck, "Microcomputers and Microprocessors", Prentice Hall, pp. 257–273.

Motorola, Inc,; MC88110 Second Generation RISC Microprocessor User's Manual; 1991; pp. 6–36 through 6–38 (Errata pp. 2–3), pp. 7–1 through 7–23 (Errata 99. 3–5).

Primary Examiner—Parshotam S. Lall
Assistant Examiner—Bharat Barot
Attorney, Agent, or Firm—Susan C. Hill

[57] ABSTRACT

Method and apparatus for selectively controlling interrupt latency in a data processing system (10). In one embodiment, the present invention uses an interrupt control register bit field (50) to determine whether or not execution of an instruction may be interrupted by an interrupt request before execution of the instruction has completed. In some embodiments of the present invention, a first set of instruction may be interrupted mid-execution, while a second set of instructions always complete execution. Which instructions belong to the first set of instructions may be user programmable (e.g. by register bit field 52) or may be fixed. It is advantageous in some data processing systems (10) to define the instructions having the longest execution times as being part of the first set of instructions in order to reduce interrupt latency.

20 Claims, 6 Drawing Sheets

METHOD AND APPARATUS FOR SELECTIVELY CONTROLLING INTERRUPT LATENCY IN A DATA PROCESSING SYSTEM

FIELD OF THE INVENTION

The present invention relates in general to a data processing system, and more particularly to a method and apparatus for selectively controlling interrupt latency in a data processing system.

BACKGROUND OF THE INVENTION

Interrupts are commonly used today in data processing systems, especially in many real-time control applications. For example, a data processing system which is controlling an automobile engine may receive an interrupt request from the anti-lock braking system when the anti-lock braking system detects that the automobile has entered a skid. The maximum amount of time it will take the data processing system to respond to the interrupt is called the "maximum interrupt latency time". In most data processing systems, it is desirable to have the shortest possible interrupt latency time without reducing the normal operating performance of the data processing system.

In many real-time control applications, the maximum interrupt latency time is very important, and may even determine which data processing system is chosen for a particular application. In the example above, if a data processing system cannot respond fast enough to the interrupt from the anti-lock braking system, another data processing system with a shorter interrupt latency time will be chosen and used. It is thus very important in the data processing art to reduce the maximum interrupt latency time without significantly reducing the normal operating performance of the data processing system

DESCRIPTION OF THE PREFERRED EMBODIMENTS

The minimization of interrupt latency time in a data processing system is crucial for many real-time control applications. A data processing system often has one or more instructions (i.e. long instructions) which require a considerable amount of time to completely execute, when compared to the time required to execute the other, shorter instructions (i.e. short instructions). The time required to finish executing a long instruction before responding to a pending interrupt request may cause the interrupt latency of a data processing system to be too long. The present invention allows the execution of long instructions to be interrupted for processing of an interrupt request in order to reduce interrupt latency.

In one embodiment of the present invention, a data processing system checks to see if an interrupt request is pending at several time points during execution of each long instruction. If an interrupt request is accepted before a long instruction has finished execution, the data processing system halts execution of the long instruction and returns the data processing system to the state it had before execution of the long instruction was begun. The interrupt is then processed. Once processing of the interrupt has been completed, execution of the same long instruction is once again begun.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

DESCRIPTION OF THE FIGURES

Figure 1:
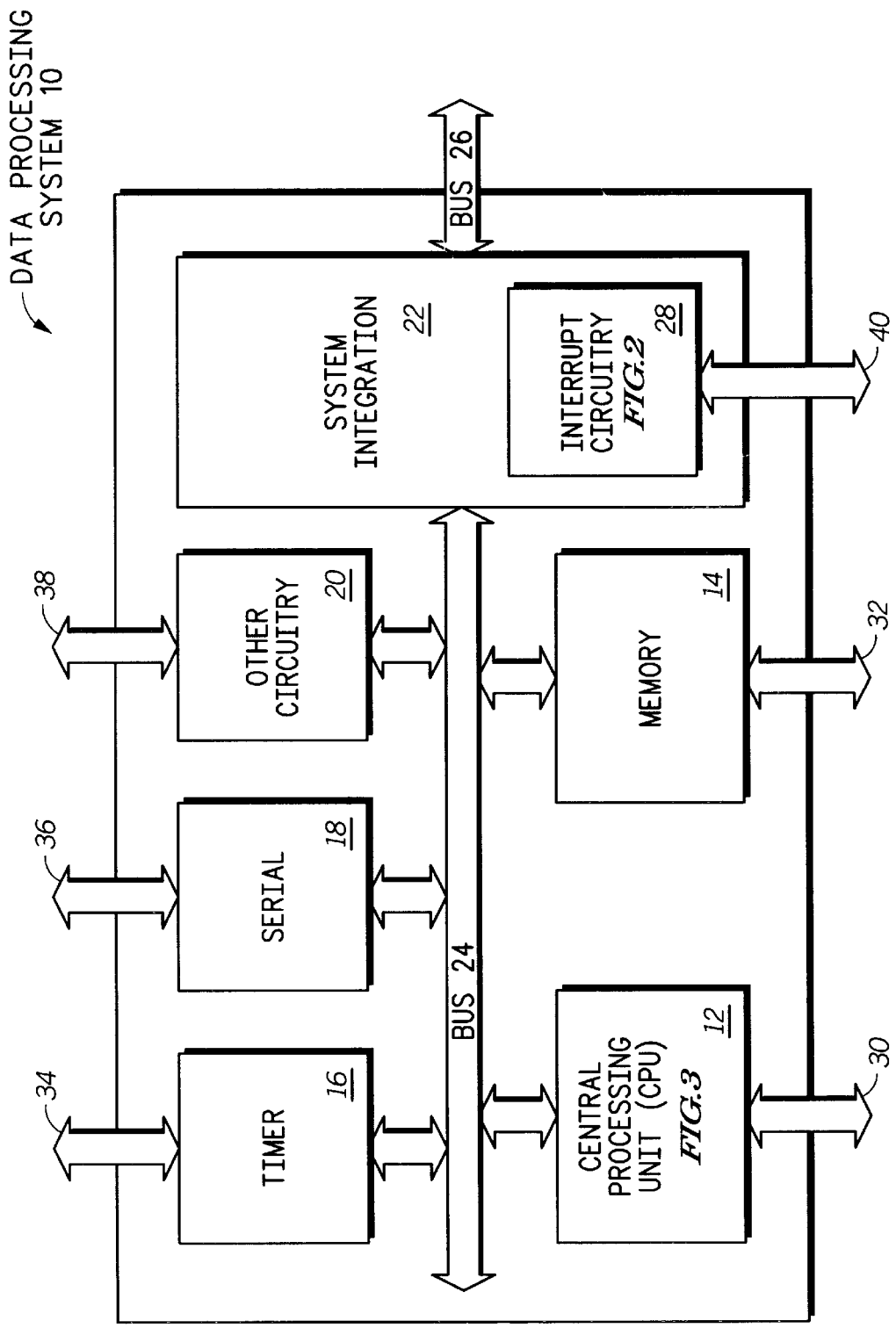
FIG. 1 illustrates, in block diagram form, a data processing system 10 in accordance with one embodiment of the present invention.

FIG. 1 illustrates a data processing system 10 having central processing unit (CPU) circuitry 12, memory circuitry 14, timer circuitry 16, serial circuitry 18, other circuitry 20, and system integration circuitry 22, which are all bi-directionally coupled to each other by way of bus 24.

CPU 12 may be coupled external to data processing system 10 by way of one or more integrated circuit terminals 30. Memory 14 may be coupled external to data processing system 10 by way of one or more integrated circuit terminals 32. Timer 16 may be coupled external to data processing system 10 by way of one or more integrated circuit terminals 34. Serial circuitry 18 may be coupled external to data processing system 10 by way of one or more integrated circuit terminals 36. And, other circuitry 20 may be coupled external to data processing system 10 by way of one or more integrated circuit terminals 38. System integration circuitry 22 is bi-directionally coupled external to data processing system 10 by way of bus 26. System integration circuitry 22 includes interrupt circuitry 28. Interrupt circuitry 28 may be coupled external to data processing system 10 by way of integrated circuit terminals 40.

In some embodiments of the present invention, data processing system 10 is a data processor which is formed on a single integrated circuit. In some embodiments data processing system 10 is a single chip microcontroller. In alternate embodiments, data processing system 10 may be implemented using any type of electrical circuitry. Memory 14 may be any type of memory. Alternate embodiments of data processing system 10 may more, fewer, or different blocks of circuitry. For example, alternate embodiments of data processing system 10 may not have memory 14, timer 16, serial 18, or other circuitry 20. Some embodiments of the present invention may include the interrupt circuitry 28 as part of CPU 12, and may or may not have system integration circuitry 22.

Integrated circuit terminals 30, 32, 34, 36, 38, and 40 may be any type of apparatus which allows electrical signals to be transferred to or from data processing system 10. For example, integrated circuit terminals 30, 32, 34, 36, 38, and 40 may be integrated circuit pins, solder bumps, wire conductors, etc. In addition, bus 26 may conduct electrical signals to and from data processing system 10 by way of integrated circuit terminals.

Figure 2:
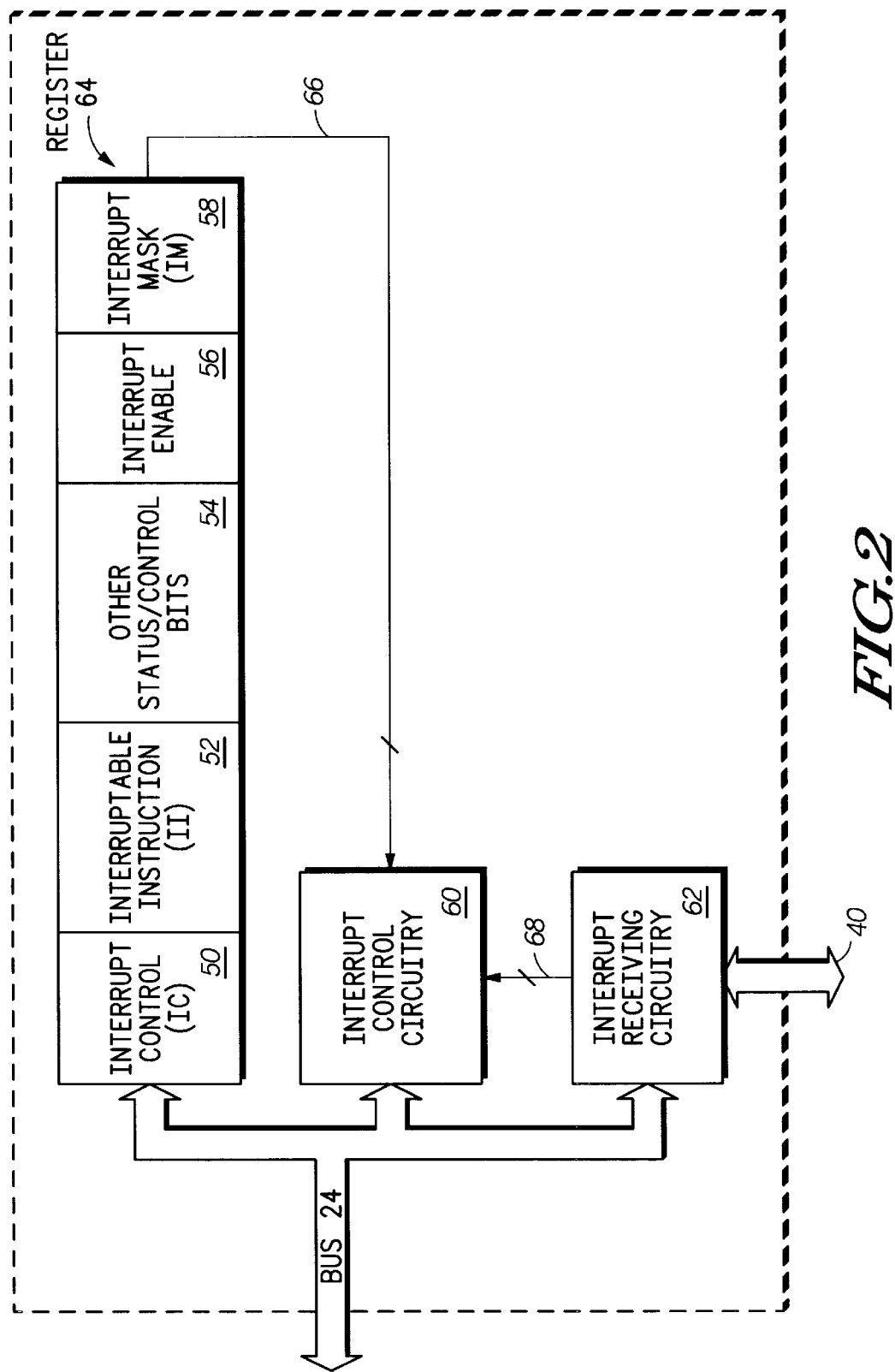
FIG. 2 illustrates, in block diagram form, interrupt circuitry 28 of FIG. 1 in accordance with one embodiment of the present invention.

FIG. 2 illustrates interrupt circuitry 28 of FIG. 1 in accordance with one embodiment of the present invention. In one embodiment of the present invention, interrupt circuitry 28 includes register circuitry 64 which is bi-directionally coupled to bus 24 so that register 64 can be read and written by CPU 12 (see FIG. 1). Interrupt circuitry 28 also includes interrupt control circuitry 60 which is coupled to bus 24 in order to receive and/or provide the bus signals related to interrupts. Interrupt circuitry 28 also includes interrupt receiving circuitry 62 for receiving interrupt requests by way of integrated circuit terminals 40 from external to data processing system 10.

In one embodiment of the present invention, interrupt receiving circuitry 62 is coupled to bus 24 and to interrupt control circuitry 60 in order to provide information regarding any incoming interrupt requests. In alternate embodiments of the present invention, interrupt receiving circuitry 62 is not coupled to bus 24; instead, interrupt receiving circuitry 62 receives an interrupt request and provides the interrupt request information to interrupt control circuitry 60 by way of one or more conductors 68. Interrupt control circuitry 60 then determines whether and when to assert the interrupt related signals on bus 24. Register 64 provides control and/or status information to interrupt control circuitry 60 by way of conductors 66.

In one embodiment, register 64 includes several register bit fields 50, 52, 54, 56, and 58, each of which includes a storage circuit for storing a control value. Although the register 64 illustrated in FIG. 2 includes five register fields (50, 52, 54, 56, and 58) which are used for control, alternate embodiments of the present invention may use more, fewer, or different register bit fields. In addition, although the five register bit fields 50, 52, 54, 56, and 58 illustrated in FIG. 2 are used for control, alternate embodiments of register 64 may also include register bit fields which are used for status, or both status and control. In addition, alternate embodiment of the present invention may locate the bit fields 50, 52, 54, 56, and 58 in one or more separate registers. Also, different embodiments of the present invention may include any numbers of bits for each of the register bits fields 50, 52, 54, 56, and 58 illustrated in FIG. 2. In some embodiments of the present invention, the control functionality of one or more of the register bit fields may be combined and encoded into fewer register bit fields.

In the embodiment of the present invention illustrated in FIG. 2, register 64 includes an interrupt control (IC) register bit field 50, an interruptable instruction (II) register bit field 52, interrupt enable register bit field 56, interrupt mask (IM) register bit field 58, and other status/control bits 54.

Figure 3:
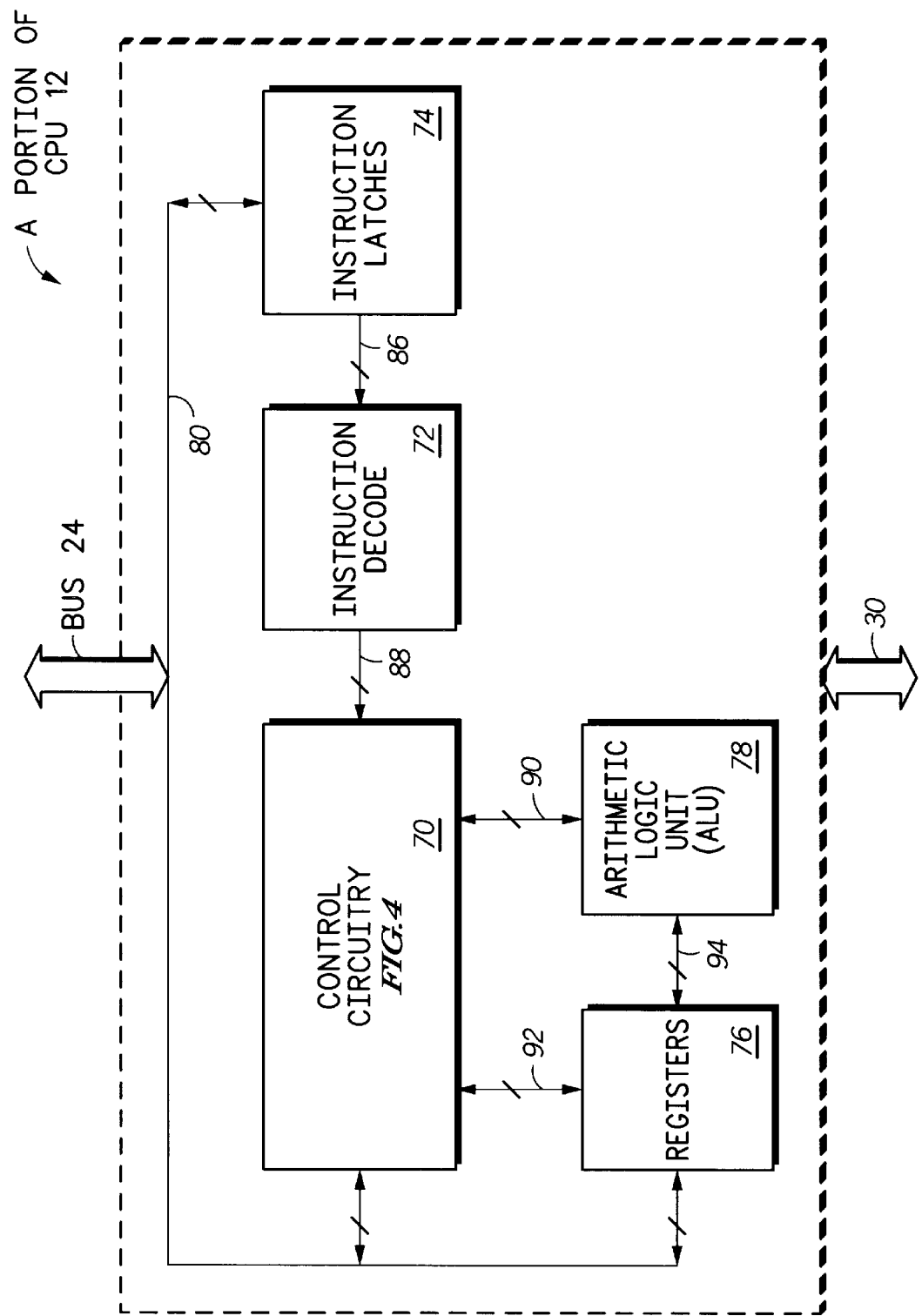
FIG. 3 illustrates, in block diagram form, a portion of central processing unit (CPU) 12 of FIG. 1 in accordance with one embodiment of the present invention.

FIG. 3 illustrates a portion of central processing unit (CPU) 12 of FIG. 1 in accordance with one embodiment of the present invention. The portion of CPU 12 illustrated in FIG. 3 includes control circuitry 70, one or more instructions latches 74, and one or more registers 76, which are each bi-directionally coupled to bus 24 by way of conductors 80. Instruction latches 74 are coupled to instruction decode circuitry 72 by way of conductors 86. Instruction decode circuitry 72 is coupled to control circuitry 70 by way of conductors 88. Arithmetic logic unit (ALU) 78 is bi-directionally coupled to control circuitry 70 by way of conductors 90. Registers 76 are bi-directionally coupled to control circuitry 70 by way of conductors 92. And, registers 76 are bi-directionally coupled to ALU 78 by way of conductors 94. In some embodiments of the present invention, CPU 12 may be coupled external to data processing system 10 by way of one or more integrated circuit terminals 30.

Figure 4:
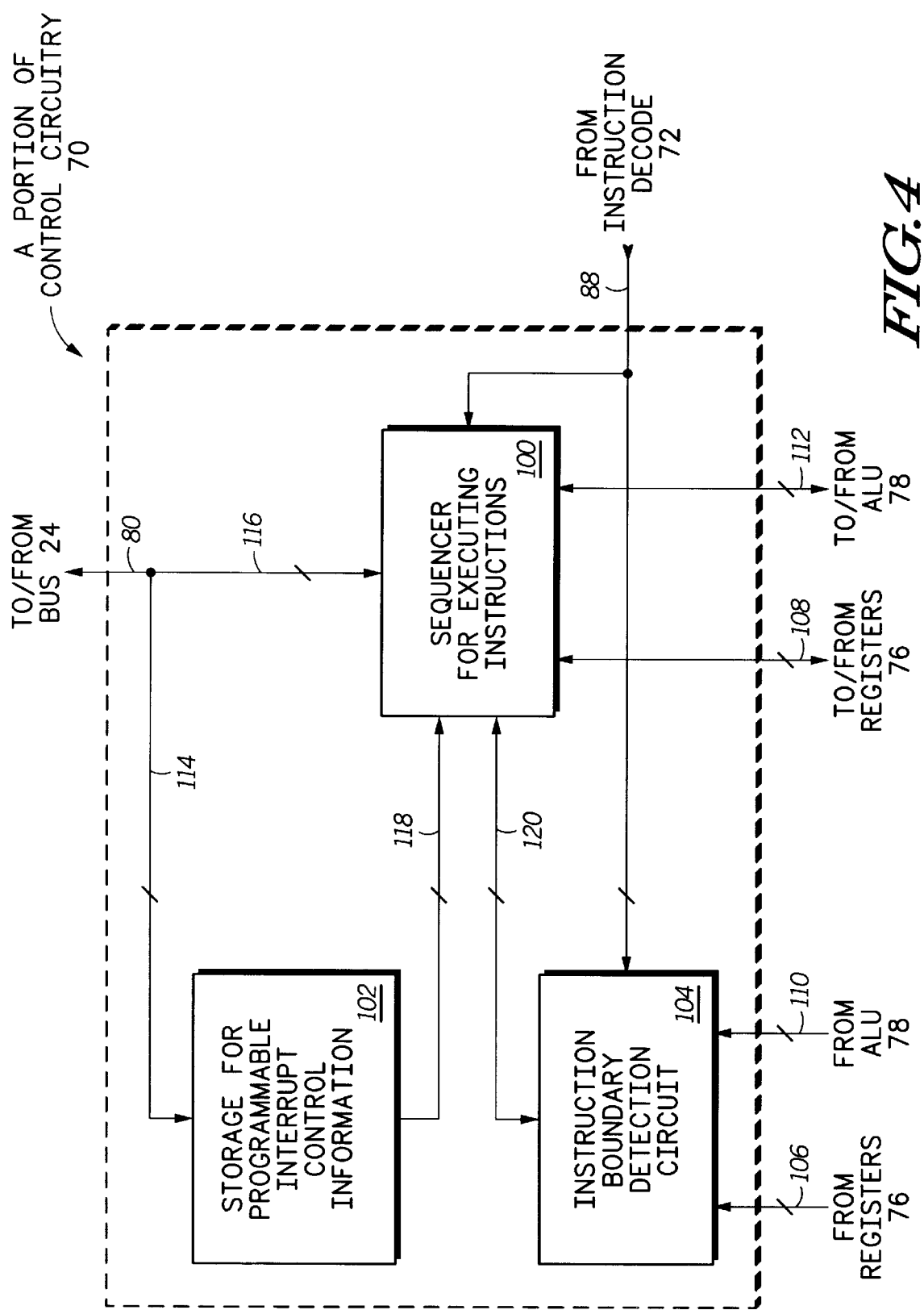
FIG. 4 illustrates, in block diagram form, a portion of control circuitry 70 of FIG. 3 in accordance with one embodiment of the present invention.

FIG. 4 illustrates a portion of control circuitry 70 of FIG. 3 in accordance with one embodiment of the present invention. Control circuitry 70 includes a circuit 102 which is a storage circuit for programmable interrupt control information, includes a circuit 100 which is a sequencer for executing instructions, and includes a circuit 104 which is an instruction boundary detection circuit. Sequencer 100 is bi-directionally coupled to bus 24 by way of one or more conductors 116. Storage circuit 102 is bi-directionally coupled to bus 24 by way of one or more conductors 114. Storage circuit 102 is bi-directionally coupled to sequencer 100 by way of one or more conductors 118. Instruction boundary detection circuit 104 is bi-directionally coupled to sequencer 100 by way of one or more conductors 120. Both instruction boundary detection circuit 104 and sequencer 100 are coupled to instruction decode circuitry 72 by way of one or more conductors 88.

Instruction boundary detection circuit 104 is coupled to receive information from registers 76 by way of one or more conductors 106, and sequencer 100 is bi-directionally coupled to registers 76 by way of one or more conductors 108. Conductors 92 (see FIG. 3) include conductors 106 and 108 (see FIG. 4). Instruction boundary detection circuit 104 is coupled to receive information from ALU 78 by way of one or more conductors 110, and sequencer 100 is bi-directionally coupled to ALU 78 by way of one or more conductors 112. Conductors 90 (see FIG. 3) include conductors 110 and 112 (see FIG. 4).

Sequencer 100 may be implemented using various types of circuitry, such as, for example, a state machine, random logic, a programmable logic array, etc. Sequencer 100 serves the function of providing the control signals to registers 76 and ALU 78 in order to execute the instruction received by instructions latches 74. Some data processing systems 10 may have only one instruction latch 74, while other data processing systems 10 may be pipelined and may have a plurality of instruction latches 74. If data processing systems 10 is pipelined, the execution of a first instruction may be overlapped with the decoding of a next instruction.

Figure 5:
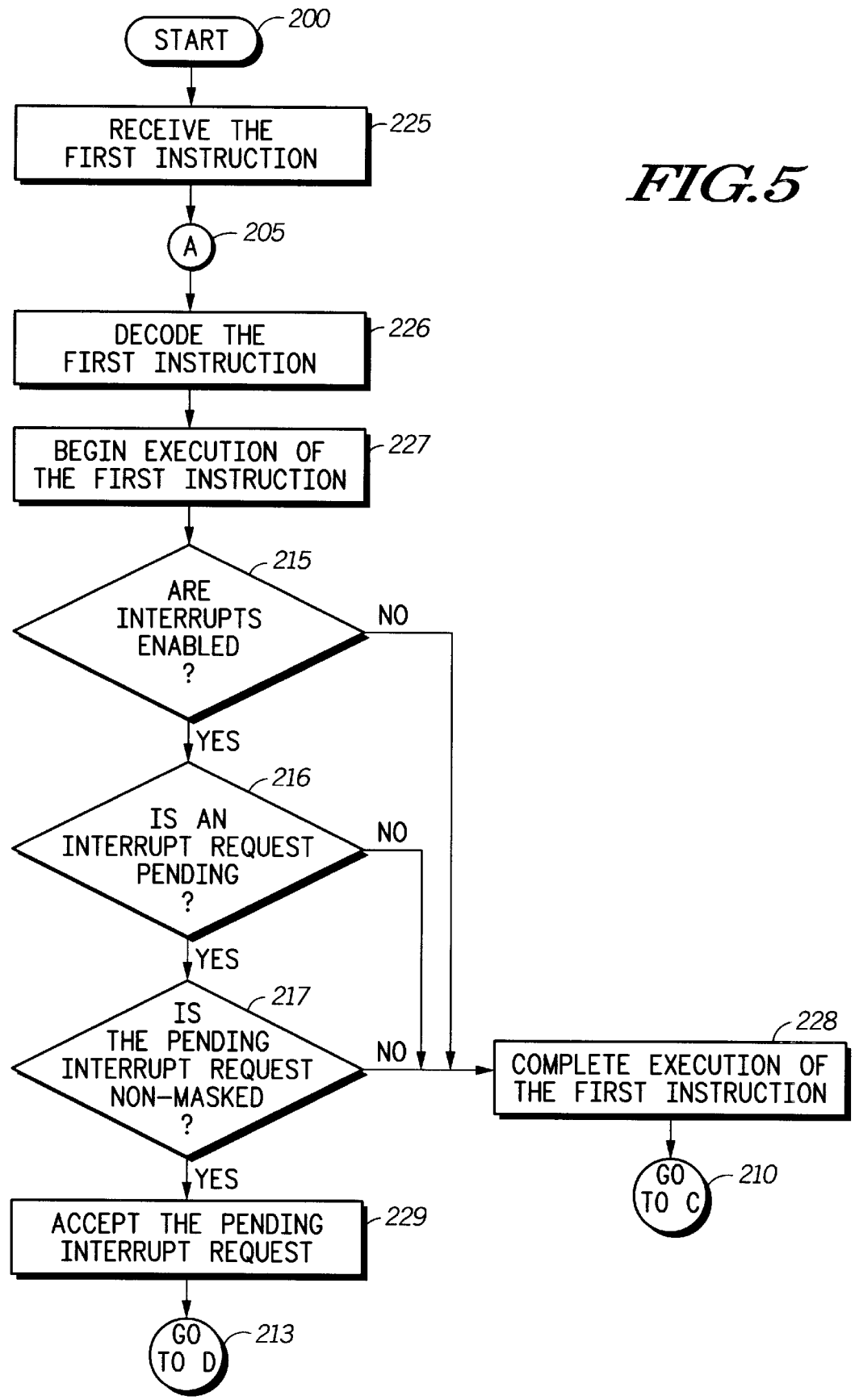
FIGS. 5 and 6 illustrate, in flow diagram form, a method to selectively control interrupt latency in a data processing system in accordance with one embodiment of the present invention.
Figure 6:
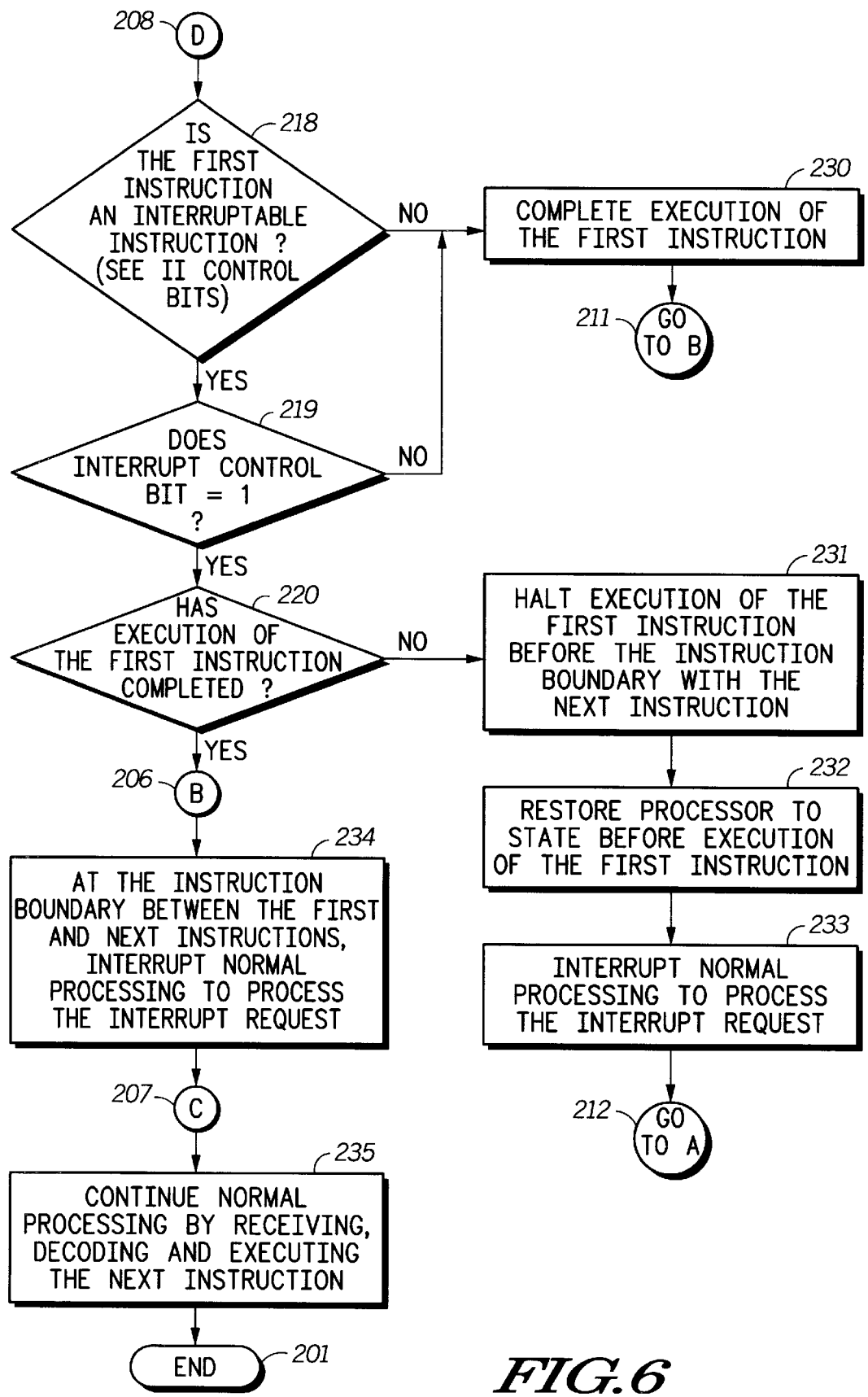

FIGS. 5 and 6 illustrate, in flow diagram form, a method to selectively control interrupt latency in a data processing system in accordance with one embodiment of the present invention. Referring to FIGS. 5 and 6, flattened ovals 200–201 represent starting and ending points in the flow diagram. Circles 205–208 represent particular points in the flow diagram. Circles 210–213 represent transitions to particular points in the flow diagram. Diamonds 215–220 represent decision points in the flow diagram. Rectangles 225–235 represent steps which are performed in order to selectively control interrupt latency in a data processing system.

Operation of the Preferred Embodiments

The operation of the present invention will now be discussed. The minimization of interrupt latency time in a data processing system is crucial for many real-time control applications. A data processing system often has one or more instructions (i.e. long instructions) which require a considerable amount of time to completely execute, when compared to the time required to execute the other, shorter instructions (i.e. short instructions). The time required to finish executing a long instruction before responding to a pending interrupt request may cause the interrupt latency of a data processing system to be too long. The present invention allows the execution of long instructions to be interrupted for processing of an interrupt request in order to reduce interrupt latency.

In one embodiment, the present invention uses an interrupt control register bit field 50 (see FIG. 2) to determine whether or not execution of an instruction may be interrupted by an interrupt request before execution of the instruction has completed. In some embodiments of the present invention, a first set of instructions may be interrupted mid-execution, while a second set of instructions always complete execution. Which instructions belong to the first set of instructions may be user programmable, e.g. by register bit field 52 in FIG. 2, or may be fixed. It is advantageous in some data processing systems (10) to define the instructions having the longest execution times as being part of the first set of instructions, the interruptable instructions, in order to reduce interrupt latency.

In one embodiment of the present invention, a data processing system checks to see if an interrupt request is pending at several time points during execution of each long instruction. If an interrupt request is accepted before a long instruction has finished execution, the data processing system halts execution of the long instruction and returns the data processing system to the state it had before execution of the long instruction was begun. The interrupt is then processed. Once processing of the interrupt has been completed, execution of the same long instruction is once again begun.

Referring to FIG. 3 and step 225 in FIG. 5, instruction latches 74 receive the first instruction by way of bus 24. The first instructions may be any instruction which data processing system 10 is capable of executing. The first instruction may be an instruction in a primary program, in a subroutine, in an interrupt processing routine, or in any other such computer program. Bus 24 may provide the instruction from internal to data processing system 10 (e.g. from memory 14 in FIG. 1), or from external to data processing system 10 by way of bus 26 and system integration circuitry 22.

Referring to FIG. 3 and step 226 in FIG. 5, instruction latches 74 provide the first instruction to instruction decode circuitry 72. Instruction decode circuitry 72 decodes the first instruction and provides the resulting signals to control circuitry 70 by way of conductors 88. Control circuitry 70 then begins execution of the first instruction by providing control signals to registers 76 and ALU 78 to carry out the operation of the first instruction. For example, the first instruction may be an add instruction or a multiply instruction, and control circuitry 70 provides the appropriate signals to registers 76 and ALU 78 to perform the required operations.

Referring to FIG. 2, interrupt receiving circuitry 62 may monitor the integrated circuit terminals 40 in order to determine whether any device (not shown) external to data processing system 10 is requesting an interrupt. In addition, interrupt receiving circuitry 62 may also monitor bus 24 in order to determine whether any circuitry (e.g. 16, 18, or 20 in FIG. 1) internal to data processing system 10 is requesting an interrupt.

Interrupt receiving circuitry 62 then provides the information to interrupt control circuitry 60 as to whether or not an interrupt request has been made. Referring to decision diamond 215 in FIG. 5, the interrupt control circuitry receives the interrupt enable control bit 56 from register 64 by way of conductors 66 and determines whether or not interrupts are enabled. Referring to step 228, if interrupts are not enabled, CPU 12 (see FIG. 3) receives no interrupt request and execution of the first instruction completes without interruption in the normal manner. Referring to step 235, instruction execution then continues with the fetching, receiving, decoding, and executing of the next instruction.

Referring to decision diamond 216 in FIG. 5, if interrupts are enabled, interrupt control circuitry 60 checks the input signals 68 from interrupt receiving circuitry 62 in order to determine if any interrupt request has been received and is pending. If no interrupt request has been received, then CPU 12 (see FIG. 3) receives no interrupt request and execution of the first instruction completes without interruption in the normal manner (see steps 228 and 235 in FIGS. 5 and 6 respectively).

Referring to decision diamond 217 in FIG. 5, if an interrupt request has been received and is pending, interrupt control circuitry 60 receives the interrupt mask control bits 58 from register 64 by way of conductors 66 and determines whether or not the received interrupt is masked. The masking of interrupts is well know in the data processing art. If the interrupt is masked, for example because the received interrupt has a priority level below a threshold priority determined by the interrupt mask control bits 58, then CPU 12 (see FIG. 3) receives no interrupt request and execution of the first instruction completes without interruption in the normal manner (see steps 228 and 235 in FIGS. 5 and 6 respectively). However, referring to step 229 in FIG. 5, if the received interrupt request is not masked, for example because the received interrupt has a priority level above a threshold priority determined by the interrupt mask control bits 58, then the interrupt request is accepted and CPU 12 (see FIG. 3) receives an interrupt request from interrupt control circuitry 60 by way of bus 24.

Referring to decision diamond 218 in FIG. 6, if an interrupt request has been accepted, interrupt circuitry 28 provides the interrupt request to control circuitry 70 (see FIG. 3) in CPU 12 by way of bus 24 and conductors 80. In addition, in one embodiment of the present invention, interrupt circuitry 28 also provides the interrupt control bit 50 and the interruptable instruction control bits 52 from register 64 to control circuitry 70 (see FIG. 3) in CPU 12 by way of bus 24 and conductors 80. In an alternate embodiment of the present invention, the interrupt control bit 50 and the interruptable instruction control bits 52 may be located in storage circuit 102 (see FIG. 4) or alternately in registers 76 (see FIG. 3) in CPU 12, rather than in register 64 in system integration circuitry 22.

Referring to decision diamond 218, control circuitry 70 determines whether or not the first instruction is an interruptable instruction. In one embodiment of the present invention, the one or more instructions which are included in the set of N interruptable instructions are predetermined and fixed by the circuitry in control circuitry 70. For example, in one embodiment of the present invention, the set of N interruptable instructions includes a multiply instruction, the load multiple data from memory instructions, and the store multiple data to memory instructions.

In some embodiments of the present invention, the set of N interruptable instructions includes the N instructions which require the maximum number of ALU cycles to execute, or alternately the maximum overall time to execute. In some embodiments of the present invention, all of the instructions may be interruptable, and thus the interruptable instruction control bits 52 (see FIG. 2) are not needed to specify which instructions are interruptable. In other embodiments of the present invention, a first set of N instructions are interruptable, and a second set of K instructions are not interruptable. In yet other embodiments of the present invention, the interruptable instruction control bits 52 may instead be used to specify the second set of K instructions which are not interruptable. The interruptable instruction control bits 52 may thus be used to store an instruction selection value which provides the information to control circuitry 70 as to which instructions are interruptable and which instructions are not interruptable.

Again referring to decision diamond 218, control circuitry 70 determines whether or not the first instruction is an interruptable instruction. If the first instruction is not an interruptable instruction, execution of the first instruction completes without interruption in the normal manner (see step 230 in FIG. 6). Then, the interrupt request is processed at the instruction boundary between the first instruction and the next instruction (see step 234 in FIG. 6). And finally, normal instruction execution continues with the fetching, receiving, decoding, and executing of the next instruction (see step 235 in FIG. 6).

Referring to decision diamond 219, if the first instruction is an interruptable instruction, control circuitry 70 determines the value of the interrupt control bit 50. In one embodiment of the present invention, if the interrupt control bit 50 has a first value (e.g. binary 0), then execution of the first instruction completes without interruption in the normal manner (see step 230 in FIG. 6). Then, the interrupt request is processed at the instruction boundary between the first instruction and the next instruction (see step 234 in FIG. 6). And finally, normal instruction execution continues with the fetching, receiving, decoding, and executing of the next instruction (see step 235 in FIG. 6).

Note that the instructions boundary detection circuit 104 in FIG. 4 may be used to monitor the registers 76, the ALU 78, and the state of the sequencer 100 in order to determine when the instruction boundary between the first and second instruction has been reached. Note that in alternate embodiments of the present invention, the functionality of the instruction boundary detection circuit 104 may be combined together with the functionality of sequencer 100 to form one circuit.

Still referring to decision diamond 219, if the interrupt control bit 50 has a second value (e.g. binary 1), then control circuitry 70 checks whether execution of the first instruction has completed (see decision diamond 220 in FIG. 6). In one embodiment of the present invention, the instruction boundary detection circuit 104 (see FIG. 4) determines whether execution of the first instruction has completed. If execution of the first instruction has completed, then the interrupt request is processed at the instruction boundary between the first instruction and the next instruction (see step 234 in FIG. 6), and normal instruction execution continues with the fetching, receiving, decoding, and executing of the next instruction (see step 235 in FIG. 6).

However, if execution of the first instruction has not completed (see step 231 in FIG. 6), execution of the first instruction is halted BEFORE the instruction boundary between the first instruction and the next instruction. Thus, interrupt processing is not held off while the first instruction finishes execution; and therefore interrupt latency is reduced. In one embodiment of the present invention, the partial results of the first instruction are discarded and the data processing system 10 is returned to the same state the data processing system 10 had before execution of the first instruction began (see step 232 in FIG. 6). The interrupt request is processed BEFORE the instruction boundary between the first instruction and the next instruction (see step 233 in FIG. 6). After processing of the interrupt request has completed, the data processing system 10 will re-decode and re-execute the first instruction (see circles 212 in FIG. 6) because execution of the first instruction has not completed.

Note that under certain abnormal circumstances (e.g. system power too low to continue), the interrupt service routine called in step 233 may fundamentally disrupt the software flow and may not return to the instruction that was interrupted (i.e. the first instruction). However, most interrupt service routines will eventually return to the instruction that was interrupted (i.e. circle 205).

If the partial results of the first instruction have been discarded, the re-decoding and re-execution of the first instruction must begin again at the beginning (see step 226 in FIG. 5). However, if the partial results of the first instruction were saved, execution of the first instruction may pick up at the point in time during execution where the partial results were saved. For example, some embodiments of the present invention may not requires the first instruction to be fetched again because the first instruction may still be stored in instruction latches 74 (see FIG. 3). If there is no second interrupt pending (see decision diamond 216), the re-execution of the first instruction will complete (see step 228 in FIG. 5), and normal instruction execution will continue with the fetching, receiving, decoding, and executing of the next instruction (see step 235 in FIG. 6).

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

I claim:

1. A method for operating a data processing system, the method comprising the steps of:

decoding a first instruction;

beginning execution of the first instruction;

accepting an interrupt request during execution of the first instruction;

if a storage circuit stores a first value, interrupting the data processing system and processing the interrupt request at an instruction boundary between the first instruction and a second instruction wherein the second instruction is to be executed within the data processing system after the first instruction; and if the storage circuit stores a second value, interrupting the data processing system and processing the interrupt request after execution of the first instruction has begun but before the instruction boundary between the first instruction and the second instruction, wherein if the first instruction has not completed when the interrupt request is processed, returning the data processing system to a state the data processing system had before said step of beginning execution of the first instruction.

2. A method as in claim 1, further comprising the step of:

if the storage circuit stores the second value and if the first instruction has riot completed when the interrupt request is processed, beginning execution of a third instruction after the interrupt request has been processed.

3. A method as in claim 1, further comprising the step of:
if the storage circuit stores the second value and if the first instruction has not completed when the interrupt request is processed, repeating said step of beginning execution of the first instruction after the interrupt request has been processed.

4. A method as in claim 1, further comprising the step of:
determining if the interrupt request is enabled.

5. A method as in claim 1, further comprising the step of:
determining if the interrupt request is masked.

6. A method as in claim 1, wherein the first instruction is one of N instructions within a set of N instructions where N is a positive finite integer.

7. A method as in claim 6, wherein the N instructions within the set of N instructions have execution times which are than all other instructions executable by the data processing system.

8. A method as in claim 7, further comprising the steps of:
programmably selecting the N instructions within the set of N instructions.

9. A method as in claim 8, wherein said step of selecting comprises the step of:
storing an instruction selection value in a programmable register within the data processing system.

10. A data processor, comprising:
interrupt circuitry for accepting an interrupt request;
a first storage circuit for storing an interrupt control value;
instruction boundary detection circuitry for detecting an instruction boundary between a first instruction and a second instruction; and
control circuitry for controlling execution of the first and second instructions, said control circuitry being coupled to said interrupt circuitry, to said first storage circuits and to said instruction boundary detection circuitry;
wherein if the interrupt control value has a first value and said interrupt circuitry accepts the interrupt request during execution of the first instruction, said control circuitry processes the interrupt request at the instruction boundary between the first instruction and the second instruction, and wherein if the interrupt control value has a second value and said interrupt circuitry accepts the interrupt request during execution of the first instruction, said control circuitry processes the interrupt request during execution of the first instruction, wherein if the first instruction has not completed when the interrupt request is processed, returning the data processing system to a state the data processing system had before said step of beginning execution of the first instruction.

11. A data processor as in claim 10, further comprising:
a second storage circuit for storing an interrupt enable value, said second storage circuit being coupled to said interrupt circuitry.

12. A data processor as in claim 11, further comprising:
a third storage circuit for storing an interrupt mask value, said third storage circuit being coupled to said interrupt circuitry.

13. A data processor as in claim 10, further comprising:
a second storage circuit for storing an interruptable instruction value, said second storage circuit being coupled to said control circuitry;
wherein the interruptable instruction value defines a set of N instructions which are interruptable, where N is a positive integer.

14. A data processor as in claim 10, further comprising:
decode circuitry for decoding the first and second instructions, said decode circuitry being coupled to said control circuitry; and
an arithmetic logic unit, coupled to said control circuitry.

15. A method for operating a data processing system, the data processing system having a first set of N instructions and having a second set of K instructions, where N and K are positive integers, the method comprising the steps of:
beginning execution of a first instruction;
accepting a first interrupt request during execution of the first instruction;
if the first instruction belongs to the first set of N instructions and if a first control register field has a first value, performing the following steps:
completing execution of the first instruction;
processing the first interrupt request; and
beginning execution of a second instruction;
if the first instruction belongs to the first set of N instructions, if the first control register field has a second value, and if execution of the first instruction has not completed, performing the following steps:
halting execution of the first instruction;
returning the data processing system to a state the data processing system had before execution of the first instruction began;
interrupting the data processing system and processing the first interrupt request; and
repeating said step of beginning execution of the first instruction;
and if the first instruction belongs to the second set of K instructions, performing the following steps:
completing execution of the first instruction;
processing the first interrupt request; and
beginning execution of the second instruction.

16. A method as in claim 15, further comprising the step of:
selecting which instructions are part of the first set of N instructions.

17. A method as in claim 16, wherein said step of selecting comprises the step of:
storing a third value in a second control register field, wherein said third value selects which instructions are part of the first set of N instructions.

18. A method as in claim 15, wherein each instruction in the first set of N instructions requires more time to execute than each instruction in the second set of K instructions.

19. A method as in claim 15, wherein a first instruction in the first set of N instructions is a multiply instruction.

20. A method for operating a data processing system, the method comprising the steps of:
beginning to execute a first computer instruction within the data processing system;
receiving an interrupt during execution of the first computer instruction;
accessing a plurality of control bits within the data processing which indicate that the first instruction is to be prematurely terminated in order to process the interrupt;
terminating execution of the first instruction before completion of the first instruction in order to process the interrupt;

processing the interrupt;

returning the data processing system to a state the data processing system had before said step of beginning to execute the first computer instruction; and beginning execution of the first computer instruction once again after completion of the processing of the interrupt.

* * * * *

UNITED STATES PATENT AND TRADEMARK OFFICE
CERTIFICATE OF CORRECTION

PATENT NO.    : 5,889,973
DATED         : March 30, 1999
INVENTOR(S)   : William C. Moyer It is certified that error(s) appear in the above-identified patent and that said Letters Patent is hereby corrected as shown below:

In claim 2, column 8, line 67;
After has, delete "riot" and insert - - not - - .

Signed and Sealed this

Second Day of November, 1999

Attest:

Q. TODD DICKINSON

Attesting Officer

Acting Commissioner of Patents and Trademarks